May 9, 1961  D. F. CARIS ET AL  2,983,554
ENGINE BEARING ASSEMBLY AND METHOD OF MAKING THE SAME
Filed March 17, 1958
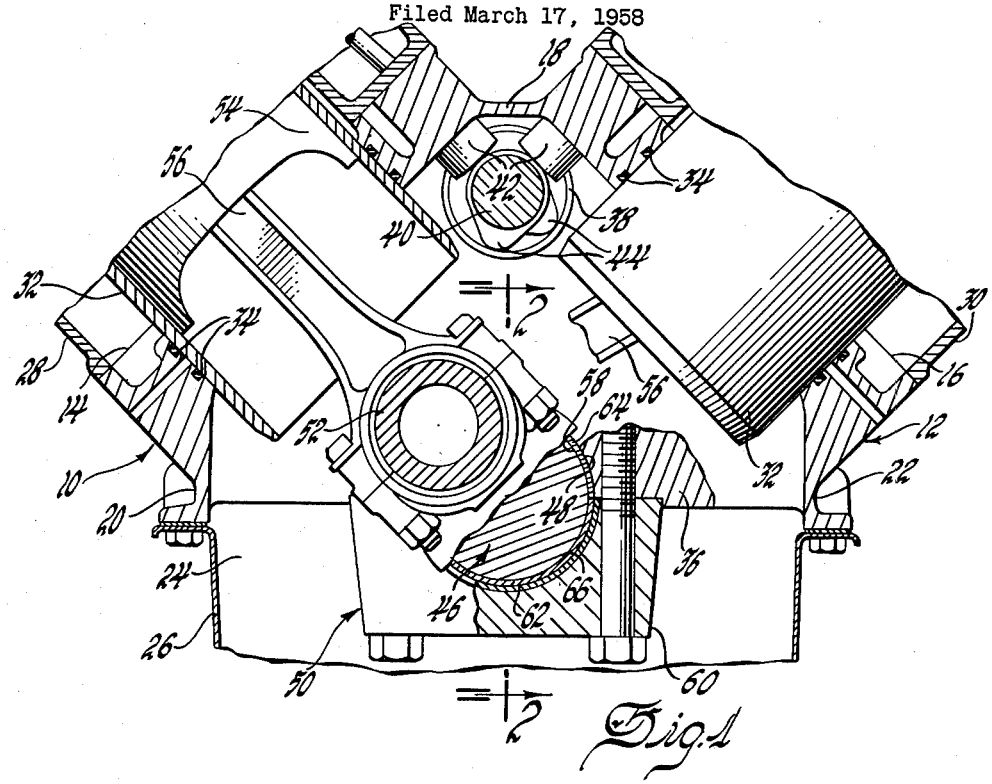
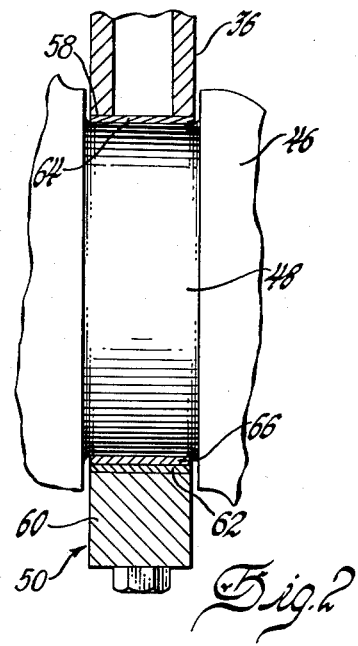
INVENTORS
Darl F. Caris &
Boris J. Mitchell
BY
*L.D.Burek*
ATTORNEY

United States Patent Office 2,983,554
Patented May 9, 1961

2,983,554
ENGINE BEARING ASSEMBLY AND METHOD OF MAKING THE SAME

Darl F. Caris, Bloomfield Hills, and Boris J. Mitchell, Birmingham, Mich., assignors to General Motors Corporation, Detroit, Mich., a corporation of Delaware Filed March 17, 1958, Ser. No. 721,756

9 Claims. (Cl. 308—23)

The present invention relates to internal combustion engines and more particularly to bearings for such engines.

In the past numerous attempts have been made to produce internal combustion engines out of lightweight metals such as alloys of aluminum and magnesium, etc. Although a limited number of engines of this nature have been built in the past, for numerous reasons, these are not suitable for mass production such as employed in the automotive industry. In such engines, the cylinder block, heads, etc. are castings of lightweight alloys while the highly stressed members such as the crankshaft, etc. are fabricated from a stronger material such as steel. The lightweight alloys have a considerably higher coefficient of thermal expansion than the steel. As a result, if the main bearings for supporting the steel crankshaft are formed by steel bearing inserts secured in a surrounding of the light weight alloys, the surrounding structure will expand faster than the crankshaft when the temperature rises. Under these circumstances the clearance space between the journal and bearing surfaces will vary as the temperatures of the bearings and journals vary, thereby providing inadequate clearance at some temperature and excessive clearances at other temperatures.

It is now proposed to provide a simplified bearing structure particularly adapted for rotatably supporting a crankshaft of one metal in an engine structure of another metal having a very dissimilar thermal coefficient of expansion. More particularly, this is to be accomplished by providing a semi-cylindrical recessed surface in a transverse bulkhead in the engine crankcase and a registering semi-cylindrical recessed surface in a bearing cap secured onto the bottom of the bulkhead. The portion of the surface in the bulkhead is formed by the lightweight alloy and is subject to the higher rate of thermal expansion of such a material. The bearing cap is made of a material having a thermal coefficient of expnsion similar to that of the crankshaft and has sufficient strength to control the size of the bearing. Thus, by providing the bearing cap of a metal having a thermal coefficient of expansion compatible with the crankshaft, the bearing clearance can be maintained at a desired amount under all operating conditions.

Since the bearing cap and the bulkheads are of materials having contrasting machining characteristics, difficulties may be experienced in machining a true cylindrical surface onto the mating semi-cylindrical recesses when the bearing cap is secured in position on the bulkhead. It is therefore proposed to provide a relatively thin coating of a material similar to the material of the bulkhead on the surface of the recess in the cap. Thus the cap may be secured in position on the bulkhead and the bearing surface simultaneously machined into the crankcase bulkhead and the coating on the bearing cap. Since the entire bearing surface is machined into the same kind of metal, the cutting operation will not be alternating between metals having contrasting machining characteristics. As a result, a true cylindrical shape may be obtained.

In order to maintain the bearing inserts or "shells" secured in position, it is customary to form the inserts slightly larger than the size of the mating recesses in the bulkhead and bearing cap. As a result, when the bearing cap is secured in position, the inserts will be placed in compression and clamped in position. If the bulkhead and bearing cap are of lightweight materials having a high coefficient of expansion, when the engine is cold, the contraction of the bulkhead and cap will compress the bearing inserts beyond their yield point and will thereby create a permanent set therein. Thus when the operating temperatures of the engine are again reached, the bulkhead and cap will expand sufficiently to relieve all compressive loads in the bearing inserts. As a result, the inserts will become a loose fit and free to move in the recesses.

In the drawings:

Figure 1 is a fragmentary cross-sectional view of an engine embodying the present invention.

Figure 2 is a longitudinal cross-sectional view taken substantially along the plane of line 2—2 in Figure 1.

Referring to the drawings in more detail, the present invention may be employed on any suitable internal combustion engine 10; for example, a so-called V-type engine. This engine may be similar to that disclosed and claimed in copending application Serial No. 716,904, filed February 24, 1958, in the name of Darl F. Caris.

In this engine 10 the cylinder block includes a crankcase member 12 having a pair of angularly disposed faces 14 and 16 that extend longitudinally along the sides thereof. The faces 14 and 16 are interconnected with each other by a web 18. Side walls 20 and 22 project downwardly from the faces 14 and 16 to form a crankcase 24. The lower portion of this crankcase 24 is closed by an oil pan 26.

A cylinder bank member 28 and 30 is secured to each of these faces 14 and 16 to form a pair of angularly disposed cylinder banks. The bank members 28 and 30 include cylinder liners 32 that extend therethrough and open into the crankcase 24 to form the cylinders. The lower ends of these liners 32 are retained in position by a pair of resilient O ring seals 34 such as disclosed and claimed in copending application Serial No. 667,654 filed June 24, 1957, now abandoned, in the name of Darl F. Caris and assigned to the common assignee.

The crankcase 24 is divided into a plurality of separate compartments by a plurality of transversely extending bulkheads 36. The tops of these bulkheads 36 include bearing inserts 38 for rotatably supporting a camshaft 40. Hydraulic slack adjusters or tappets 42 ride on the cams 44 on said shaft 40 for actuating the engine valves. In order to decrease the weight of the engine 10, reduce the machining costs and other reasons, it has been found desirable for the crankcase member 12 and cylinder bank members 28 and 30 to be frabricated from lightweight materials such as alloys of aluminum or magnesium, etc.

The crankshaft 46 includes a plurality of journals 48 rotatably supported by main bearing structures 50 in the bottoms of the bulkheads 36 and a plurality of throws 52 operatively interconnected with the pistons 54 in the cylinder liners 32 by suitable connecting rods 56. Due to the heavy loads imposed on the crankshaft 46, it is advantageous for the crankshaft 46 to be fabricated from a suitable steel. Each of the bearing structures 50, which carry the crankshaft 46, comprises a pair of bearing inserts or shells seated on a semi-cylindrical surface 58 recessed into a bulkhead 36 and a registering semi-cylindrical surface recessed into a bearing cap 60 that is bolted or otherwise suitably secured onto the bottom of the bulkhead 36.

Since the crankshaft 46 is preferably fabricated from a suitable steel alloy and the bulkhead 36 consists of a lightweight alloy, the bulkhead 36 will have a considerably higher coefficient of thermal expansion than the crankshaft 46. Accordingly, if the size of the bearing structure 50 is controlled entirely by the lightweight alloy in bulkhead 36, as the engine 10 heats up, the bearing structure 50 will expand faster than the crankshaft 46, and consequently, the clearance space in the bearing structure 50 will become excessively large.

In order to overcome the foregoing difficulties, the bearing cap 60 may be fabricated from a material such as cast iron having a coefficient of thermal expansion considerably below that of the bulkhead 36 and compatible with that of the crankshaft 46. This bearing cap 60 is designed to have sufficient strength to retain its shape and to thereby substantially control the size of the bearing structure 50.

In order to obtain as true a cylindrical shape as possible for the bearing surface, it is preferable for any final machining operations on the registering recesses to be performed while the bearing cap 60 is secured in position on the bulkhead 36. Since the machining characteristics of a lightweight alloy and cast iron or steel are very different, it would be difficult to machine a true cylindrical shape into a surface consisting of alternate portions of cast iron or steel and a lightweight alloy. To overcome this difficulty, the surface of the semi-cylindrical recess in the bearing cap 60 is preferably formed by a layer 62 of material having machining characteristics similar to the material in the bulkhead 36. Thus the bearing cap 60 may be secured in position on the bottom of the bulkhead 36 and a cylindrical surface machined therein. This surface will be machined into the material of the bulkhead and in the layer 62 of similar material on the bearing cap 60. Since the material being machined is substantially uniform, the machining operation is more accurate and will provide a truer cylindrical surface. This layer 62 of material may be formed on the bearing cap 60 by any suitable means. The thickness of the layer 62 is not critical but it should be sufficiently thick to permit machining thereof without entirely removing the layer 62.

A pair of bearing inserts or "shells" 64 and 66 are disposed in the recesses to form the actual bearing surface that rotatably carries the crankshaft 46. These inserts 64 and 66 may be fabricated from any suitable material for a bearing. These inserts are preferably of the type disclosed and claimed in copending application Serial No. 450,351, filed August 17, 1954, now abandoned, in the name of Archie D. McDuffie and assigned to the common assignee.

The circumferential length of the inserts 64 and 66 is preferably slightly longer than the length of the recesses. As a result when the bearing cap 60 is tightened into position, the inserts 64 and 66 will be compressively loaded and thereby clamped into position against rotation in the recesses. Since the coefficient of expansion of the bearing cap 60 and the inserts 64 and 66 are similar, an adequate compressive load can be maintained on the inserts at all times. Heretofore, when the cap 60 and bulkhead 36 were fabricated of lightweight materials having high coefficients of expansion, if the necessary compressive loads were maintained in the inserts at the higher operating temperatures, the excessive contraction of the bulkhead 36 and cap 60 at the lower temperatures would compress the inserts 64 and 66 beyond their elastic limits and cause a permanent set therein. As a result when the higher operating temperatures again occur, the inserts would be a loose fit. By employing the bearing cap having a lower coefficient of expansion, this difficulty is eliminated and a satisfactory compressive load is maintained in the inserts 64 and 66 at all times.

It is to be understood that, although the invention has been described with specific reference to a particular embodiment thereof, it is not to be so limited since changes and alterations therein may be made which are within the full intended scope of this invention as defined by the appended claims.

What is claimed is:

1. A bearing structure for rotatably supporting a member of one material on another member consisting of a material having a higher coefficient of thermal expansion than said first material, said bearing structure comprising a bearing cap member secured to said second member, a cylindrical passage extending through said second and third members with the axis thereof disposed substantially in the plane of the junction between said second and third members, said third member consisting of a material having a coefficient of expansion substantially less than the expansion rate of said second member, the portion of said passage in said third member having a surface formed by a layer of material on said third member similar to that of said second member.

2. A bearing structure for rotatably supporting a member of one material on another member consisting of a material having a higher coefficient of thermal expansion than said first material, said bearing structure comprising a bearing cap member secured to said second member, a cylindrical passage extending through said second and third members with the axis thereof disposed substantially in the plane of the junction between said second and third members, said third member consisting of a material having a coefficient of expansion substantially less than the expansion rate of said second member, the portion of said passage in said third member having a surface formed by a layer of material on said third member similar to that of said second member, a pair of semi-cylindrical bearing inserts disposed in said passage and clamped therein by said cap member, said inserts forming a bearing surface for slidingly engaging the exterior of said first member.

3. In an internal combustion engine having a cylinder block with a crankcase for enclosing a rotating crankshaft and having a transverse bulkhead of a material having a higher coefficient of thermal expansion than said crankshaft, said bulkhead having a semi-cylindrical journal bearing recess in one side thereof, a bearing cap secured to and engaging said side of said bulkhead at spaced areas located outside of and adjacent to said recess and having a semi-cylindrical journal bearing recess registering with said first recess and of like radius to form a cylindrical passage extending through said bulkhead and said cap, said bearing cap consisting of a material having a coefficient of thermal expansion substantially less than said bulkhead and similar to that of said crankshaft.

4. In an internal combustion engine having a cylinder block with a crankcase for enclosing a rotating crankshaft and having a transverse bulkhead of a material having a higher coefficient of thermal expansion than said crankshaft, said bulkhead having a semi-cylindrical journal bearing recess in one side thereof, a bearing cap secured to and engaging said side of said bulkhead at spaced areas located outside of and adjacent to said recess and having a semi-cylindrical journal bearing recess registering with said first recess and of like radius to form a cylindrical passage extending through said bulkhead and said cap, said bearing cap consisting of a material having a coefficient of thermal expansion substantially less than said bulkhead and similar to that of said crankshaft, a first bearing insert in one of said recesses and a second bearing insert in said other recess, said inserts being compressed in said passage by said bearing cap.

5. In an internal combustion engine having a cylinder block with a crankcase for enclosing a rotating crankshaft and having a transverse bulkhead of a material having a higher coefficient of thermal expansion than said crankshaft, said bulkhead having a semi-cylindrical recess in one side thereof, a bearing cap secured to said side of said bulkhead and having a semi-cylindrical recess registering with said first recess to form a cylindrical passage extending through said bulkhead and said cap, said bearing cap consisting of a material having a coefficient of thermal expansion substantially less than said bulkhead and similar to that of said crankshaft, the surface of said recess in said cap being formed by a coating of material having machining characteristics similar to the material in said bulkhead.

6. In an internal combustion engine having a cylinder block with a crankcase for enclosing a rotating crankshaft and having a transverse bulkhead of a material having a higher coefficient of thermal expansion than said crankshaft, said bulkhead having a semi-cylindrical recess in one side thereof, a bearing cap secured to said side of said bulkhead and having a semi-cylindrical recess registering with said first recess to form a cylindrical passage extending through said bulkhead and said cap, said bearing cap consisting of a material having a coefficient of thermal expansion substantially less than said bulkhead and similar to that of said crankshaft, the surface of said recess in said cap being formed by a coating of material having machining characteristics similar to the material in said bulkhead, a first bearing insert in one of said recesses and a second bearing insert in said other recess, said inserts being compressed in said passage by said bearing cap.

7. In an internal combustion engine having a cylinder block with a crankcase for enclosing a rotating crankshaft and having a transverse bulkhead of a material having a higher coefficient of thermal expansion than said crankshaft, said bulkhead having a semi-cylindrical recess in one side thereof, a bearing cap secured to said side of said bulkhead and having a semi-cylindrical recess registering with said first recess to form a cylindrical passage extending through said bulkhead and said cap, said bearing cap consisting of a material having a coefficient of thermal expansion substantially less than said bulkhead and similar to that of said crankshaft, the surface of said recess in said cap being formed by a coating of material having machining characteristics similar to the material in said bulkhead, a pair of semi-cylindrical bearing inserts disposed in said passage and compressively loaded by said cap being secured to said bulkhead.

8. The method of forming a main bearing structure on a bulkhead in an engine for rotatably supporting a crankshaft of a metal having a coefficient of thermal expansion substantially less than said bulkhead, said method comprising the steps of forming a semi-cylindrical recess in one side of said bulkhead, forming a bearing cap out of a material having a coefficient of expansion similar to that of said crankshaft and having a semi-cylindrical recess therein, coating the recess in said bearing cap with a material having machining characteristics similar to the material in said bulkhead, securing said cap to said side of said bulkhead with said recesses registering with each other, machining the surfaces of said recesses into a true cylindrical shape.

9. The method of forming a main bearing structure on a bulkhead in an engine for rotatably supporting a crankshaft of a metal having a coefficient of thermal expansion substantially less than said bulkhead, said method comprising the steps of forming a semi-cylindrical recess in one side of said bulkhead, forming a bearing cap out of a material having a coefficient of expansion similar to that of said crankshaft and having a semi-cylindrical recess therein, coating the recess in said bearing cap with a material having machining characteristics similar to the material in said bulkhead, securing said cap to said side of said bulkhead with said recesses registering with each other, machining the surfaces of said recesses into a true cylindrical shape, removing said cap from said bulkhead, placing semi-cylindrical bearing inserts in said recesses, again securing said bearing cap onto said side and compressing said inserts against the surfaces of said recesses.

References Cited in the file of this patent

UNITED STATES PATENTS

| 1,554,493 | Eggenweiler | Sept. 22, 1925 |
| 2,324,676 | Butterfield | July 20, 1943 |

FOREIGN PATENTS

| 712,307 | Great Britain | July 21, 1954 |